T. J. McGOWAN.

Improvement in Hydrostatic Apparatus for Testing Pipes.

No. 131,405. Patented Sep. 17, 1872.

Attest
Henry Millward
Alex Tadieske

Inventor
Theodore J. McGowan
By H. Millward
Attorney

UNITED STATES PATENT OFFICE.

THEODORE J. McGOWAN, OF CINCINNATI, OHIO.

IMPROVEMENT IN HYDROSTATIC APPARATUS FOR TESTING PIPES.

Specification forming part of Letters Patent No. 131,405, dated September 17, 1872.

*To all whom it may concern:*

Be it known that I, THEODORE J. McGOWAN, of Cincinnati, Hamilton county, State of Ohio, have invented certain new and useful Improvements in Hydrostatic Apparatus for Testing Pipes, of which the following is a specification:

Nature and Objects of the Invention.

My invention has for its object the production of hydrostatic pipe-testing apparatus which is capable of convenient rapid operation, and adapted to exert a steady pressure upon the pipe under operation, the pressure being maintained without the necessity of a constantly-operating force-pump, and sufficiently prolonged to enable the operator to fully examine the pipe while under pressure. My invention consists, in the first part, of the necessary pressure-heads of the apparatus, pipe for hydrant or other supply of water, and a large air and water reservoir for communicating through suitable pipe a steady pressure to the pipe to be tested, for the purpose of enabling the pipe to be filled without drawing upon the air-pressure reservoir for water, and enabling a steady prolonged pressure to be exerted upon the pipe while under operation. My invention consists, in the second part, of a combination of pressure-heads, water-reservoir under air pressure, and water-pressure engine or press for operating the movable pressure-head between which and the stationary pressure-head the pipe to be tested is rendered water-tight at the ends. My invention consists, in the third part, of a water-pressure device, in connection with the air-pressure water-reservoir for withdrawing the stationary pressure-head after a pipe has been tested.

Description of the Accompanying Drawing.

Figure 1:
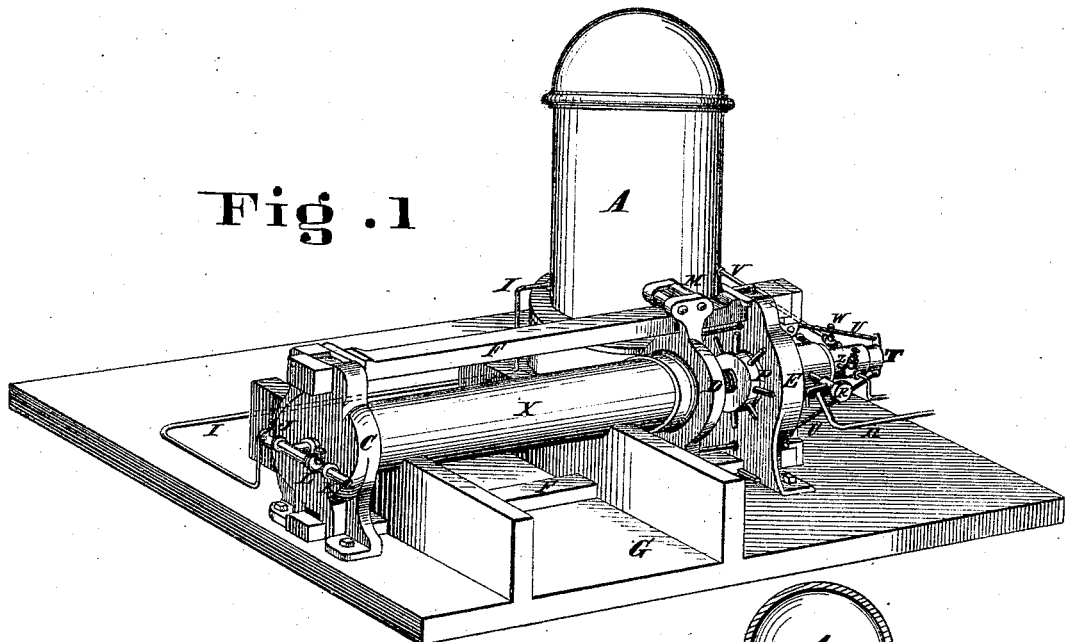
Figure 2:
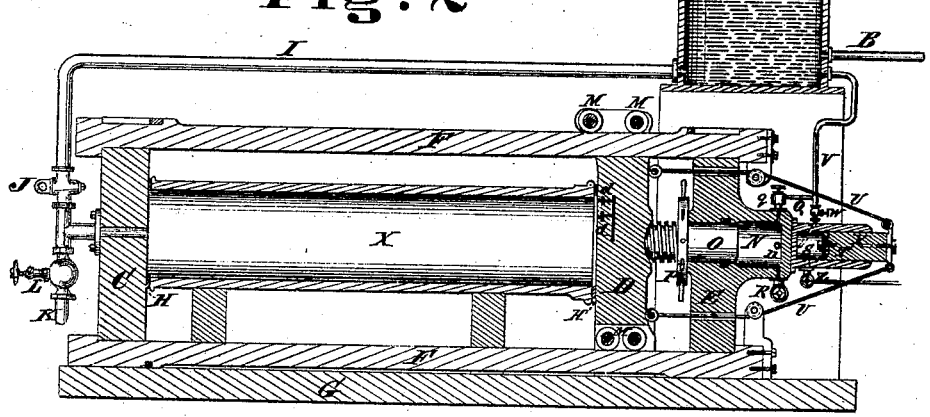

Figure 1 is a perspective view of my testing apparatus. Fig. 2 is a vertical section of the same.

General Description.

A is an "air vessel" or reservoir for the occupancy of compressed air and water. It is charged with water sufficient to compress the air to the pressure necessary for testing the pipes—about four hundred pounds per square inch. It is supplied through pipe B by a steam-pump, and as there is but little water used from the vessel in the operation of testing the pipes or movement of the movable pressure-head, the supply-pump for this vessel need not be continuously used. The frame of the hydrostatic apparatus consists of the stationary pressure-head C, the movable pressure-head D, the stationary abutment E, the connecting-rods or ties F, and, if desired, a base-plate, G. The pipe X to be tested is received between the heads C D, gaskets H being used to make the joint. A pipe, I, governed by a valve, J, communicates pressure to the pipe to be tested from the vessel A, another valve-governed pipe, K L, being also provided to supply the pipe X with water from a hydrant or otherwise, in order to avoid abstracting water to fill pipe X from the vessel A. Thus in testing a pipe very little water is drawn from vessel, but the full pressure in the air-vessel is communicated to the interior of the pipe and prolonged sufficiently to enable the operator to fully inspect the pipe before its removal, to ascertain whether it is perfect in every part. Before the valve J is opened to establish a communication between the vessel A and pipe X, the valve L is opened sufficiently to fill the pipe with water and again closed. To provide for the escape of air when the pipe X is being filled I construct the head D with air-passages $d$, governed by a single cock or valve for the discharge of air and prevention of discharge of water. A number of openings, $d$, are provided to adapt the machine for different sizes of pipes, those outside of the gasket being temporarily plugged when the machine is testing small-sized pipes. The movable head is supported upon the side rods or ties F by the introduction of rollers M, the latter supporting the weight and rolling along the bars F to reduce friction. Within the head or abutment E a cylinder, N, is formed having a piston or plunger, O, fitted to it, the outward end of which is screw-threaded and rests agaist the movable pressure-head D. A lock-nut, P, constructed with handles, serves to retain the piston in any position to which it may be forced by the hydrostatic pressure behind it. The cylinder N is first supplied with water from the vessel A sufficient to force the head against the gaskets of pipe X and partially make the joint, the water from vessel A being delivered through pipe Q. The hydrostatic pressure of a small pump connecting with aperture n suffices to increase the pressure on piston O until the pipe X is held firmly between the heads C D, the gaskets H being compressed under the strain so as to form a tight joint, the nut P serving to retain the pressure as fast as it is produced. When a great pressure is created in cylinder N through aperture port or pipe n the valve q of pipe Q is, of course, closed. When it is necessary to withdraw the pressure in cylinder N and release the head D from connection with the pipe X the nut P is slacked and the waste-valve R opened, when the head D is automatically drawn back (for the withdrawal of the tested pipe and the insertion of another for a test) by the following device: A cylinder, S, fitted with a piston, T, is secured to head E. The piston is connected by cord U with the movable head D, and when pressure of water is exerted on the piston through pipe V and valve W the head D is forcibly moved back, the vent Y preventing it being moved too far. When the head D is again moved up to confine a new pipe the waste-valve Z is open and the valve W closed.

Claims.

1. The combination, in a pipe-testing machine, of compressed air and water reservoir A, pipe I J, supply-pipe K L, and pressure-heads C D, the parts being connected together and the head D operated so as to confine the pipe X, as and for the purpose specified.

2. In the described combination with air and water reservoir A, the testing-frame C D E F F, cylinder N, piston O, and lock-nut P, the parts being connected and the whole operating substantially as described, and for the purpose specified.

3. In combination with the elements of the next-preceding clause of claims, the cylinder S, piston T, connecting-cord U, and pipes V Z W, constructed and operating substantially as and for the purpose described.

In testimony of which invention I hereunto set my hand.

T. J. McGOWAN.

Witnesses:
FRANK MILLWARD,
J. L. WARTMANN.